United States Patent [19]

van Neerbos et al.

[11] 4,212,901
[45] Jul. 15, 1980

[54] METHOD FOR TREATING A SUBSTRATE WITH A RADIATION AND CHEMICALLY CURABLE COATING COMPOSITION

[75] Inventors: Abraham van Neerbos, Tholen; Adrianus C. J. van Oosterhout, Roosendaal, both of Netherlands

[73] Assignee: Akzo nv, Arnhem, Netherlands

[21] Appl. No.: 923,353

[22] Filed: Jul. 10, 1978

[30] Foreign Application Priority Data

Jul. 8, 1977 [NL] Netherlands .................. 7707669

[51] Int. Cl.$^2$ ............................................. B05D 3/06
[52] U.S. Cl. .............................. 427/53.1; 204/159.15; 260/18 TN; 528/73; 560/26; 560/158; 427/54.1; 427/372.2
[58] Field of Search ............... 427/44, 54, 372 R, 53; 204/159.15; 560/26, 158; 260/18 TN; 528/68, 73; 96/35.1

[56] References Cited

U.S. PATENT DOCUMENTS

| | | | |
|---|---|---|---|
| 3,935,330 | 1/1976 | Smith et al. | 427/54 |
| 4,013,806 | 3/1977 | Volkert et al. | 427/54 |
| 4,025,407 | 5/1977 | Chang et al. | 427/44 |

*Primary Examiner*—John H. Newsome
*Attorney, Agent, or Firm*—Stevens, Davis, Miller & Mosher

[57] ABSTRACT

A method is provided for treating a substrate with a radiation curable coating composition based on a polyester resin esterified with acrylic acid or methacrylic acid and having a hydroxyl number in the range of from 50 to 250 and an ethylenic unsaturation equivalent weight of from 200 to 10,000 grams and on a polyisocyanate that is present in an amount of 0.7 to 1.3 equivalents of isocyanate per equivalent of hydroxyl contained in the composition. The curing of the coating composition is effected in a first stage by subjecting the composition to radiation having a wave length of 200 to 600 nm and in a second stage by reaction between the isocyanate groups of the polyisocyanate and the hydroxyl groups of the polyester resin.

7 Claims, No Drawings

METHOD FOR TREATING A SUBSTRATE WITH A RADIATION AND CHEMICALLY CURABLE COATING COMPOSITION

This invention relates to a method for treating a substrate with a radiation curable coating composition based on a polyester resin esterified with acrylic acid and/or methacrylic acid, a vinyl compound and a photoinitiator, the coating composition being dried under the influence of light having a wave length of 200 to 600 nm.

A method of the type indicated above is known from British Pat. No. 1,286,591, in which, however, the coating composition is subjected to ionizing radiation by means of an electron beam and the presence of a photoinitiator is not required. When the ionizing radiation is carried out with the aid of ultraviolet light, the man skilled in the art will usually incorporate a photoinitiator into the coating composition.

An object of the present invention is to provide a method which is technically feasible with the aid of simple devices. According to the invention use may further be made of a solvent-free composition which, after having been applied to a substrate, will be dry to the touch upon being exposed to a few seconds radiation with a UV lamp, so that the coated substrate can immediately be subjected to further treatment. In spite of the short duration of the exposure the coating layer will have the same hardness as after being baked. A further important advantage consists in that the coating layer combines good hardness with satisfactory flexibility.

The method according to this invention is now characterized in that the polyester resin esterified with (meth)-acrylic acid has a hydroxyl number in the range of 50 to 250 and an ethylenic unsaturation equivalent weight in the range of 200 to 10,000 grams, and in that the coating composition also contains a polyisocyanate in an amount of 0.7 to 1.3 equivalents of isocyanate per equivalent of hydroxyl contained in the composition.

It should be added that from British Patent No. 1,493,134 a photopolymerisable ink or varnish is known which is based on a polyurethane compound free of (an) isocyanate group(s) which is obtained by reacting a particular di- or polyisocyanate with a di- or polyacrylate having at least one free hydroxyl group. Curing the polyurethane-containing composition exclusively takes place by means of ultraviolet light. Moreover, the German Patent Application No. 2,608,835 describes the curing of a photopolymerisable coating composition based on the reaction product of an ethylenically unsaturated polyester and (meth)acrylic acid or a derivative thereof by means of a pulse beam from, for instance, a xenon pulse lamp. It is also stated that the use of, for instance, a high-pressure UV-mercury lamp does not lead to a hard, scratch-resistant coating film.

The unmodified polyester resin may be prepared in any convenient manner and is generally built up from one or more aliphatic and/or cycloaliphatic mono-, di- and/or polyvalent alcohols and one or more aliphatic, cycloaliphatic and/or aromatic divalent or polyvalent carboxylic acids and, optionally, one or more monovalent carboxylic acids and/or esters thereof. As examples of suitable alcohols may be mentioned benzyl alcohol, ethylene glycol, propylene glycol, neopentyl glycol, hexane diol, dimethylolcyclohexane, 2,2-propane-bis (4-hydroxycyclohexane), 2,2-bis(p-phenyleneoxyethanol)-propane, diethylene glycol, glycerol, trimethylolethane, trimethylolpropane, pentaerythritol and/or dipentaerythritol. Instead of or besides the alcohol compound(s) one or more epoxy compounds may be used, for instance ethylene oxide, propylene oxide, epoxy propanol and isodecanoic glycidyl ester.

As examples of suitable di- or polyvalent carboxylic acids may be mentioned maleic acid, furmaric acid, itaconic acid, citraconic acid, malonic acid, succinic acid, glutaric acid, adipic acid, azelaic acid, sebacic acid, tetrahydrophthalic acid, hexahydrophthalic acid, phthalic acid, dichlorophthalic acid, isophthalic acid, terephthalic acid and/or trimellitic acid.

The carboxylic acid also may be used in the form of an anhydride, for instance maleic anhydride or phthalic anhydride. It is preferred that as dicarboxylic acid phthalic acid should be used. Optionally, the polyester resin may further contain monocarboxylic acids such as synthetic and/or natural fatty acids having 4 to 36 carbon atoms or esters of these carboxylic acids and polyvalent alcohols such as glycerol. As examples of suitable monocarboxylic acids may be mentioned fatty acid precondensates having 5 to 10 carbon atoms, heptanoic acid, pelargonic acid, isononanoic acid, lauric acid, stearic acid, oleic acid, linoleic acid, linolenic acid, cerotic acid, benzoic acid and/or tert.butylbenzoic acid. The fatty acid content of the polyester resin may generally be in the range of 0 to 60, and preferably in the range of 0 to 35 percent by weight, based on the polyester resin. It is, of course, also possible to employ mixtures of 2 or more polyester resins. The hydroxyl number of the polyester resin(s) not esterified with acrylic acid and/or methacrylic acid is generally in the range of 55 to 550, and preferably in the range of 100 to 400.

The polyester resin may be prepared in any convenient manner, for instance by the so-called melting process in which reaction of the components takes place with evaporation of the water evolved in the reaction. If desired, however, use may be made of the solvent process, in which the water is removed azeotropically with the aid of, for instance, an organic solvent such as toluene or xylene and generally the volatile constituents are to the desired extent removed in vacuo.

Esterification of the polyester containing hydroxyl groups may be effected in some convenient manner. Usually first of all a polyester resin is prepared which has such a high hydroxyl number, for instance a hydroxyl number in the range of 55 to 550, that after esterification the modified polyester resin has the desired hydroxyl number in the range of 50 to 250. Esterification can be effected in an organic solvent, for instance toluene or xylene, use being made of an esterification catalyst, for instance p-toluene sulphonic acid, naphthalene sulphonic acid and sulphuric acid.

If desired, however, the polyester-forming components together with acrylic acid and/or methacrylic acid may be subjected to polycondensation, so that the preparation of the modified polyester resin can be effected in one step.

According to the invention the modified polyester resin has an ethylenic unsaturation equivalent weight in the range of 200 to 10,000 grams, and preferably in the range of 250 to 3,500 grams. By ethylenic unsaturation equivalent weight of the polyester is to be understood here the number of grams of polyester corresponding to 1 equivalent of the ethylenically unsaturated groups in the polyester. It is preferred that this unsaturation should for 35 to 100%, and preferably for 45 to 100%, be caused by the presence of the acrylic acid and/or methacrylic acid groups.

The radiation curable coating composition generally also contains one or more vinyl compounds, for instance in amounts of 5 to 1900, and preferably of 25 to 900 parts by weight per 100 parts by weight of the modified polyester resin. As examples of suitable vinyl compounds may be mentioned styrene, divinyl benzene, diallylphthalate and acrylic or methacrylic (hydroxy) esters of alcohols having 1 to 12 carbons atoms, such as methanol, ethanol, butanol, ethylene glycol, propylene glycol, neopentyl glycol, butane diol, hexane diol, polyethylene glycol, glycerol, trimethylol ethane, trimethylol propane and pentaerythritol.

The radiation curable coating composition further contains one or more photoinitiators in a usual amount of 0.1 to 10% by weight, based on the modified polyester resin and the vinyl compound(s). As examples of suitable photoinitiators may be mentioned aromatic carbonyl compounds such as benzoin and ethers thereof, such as the methyl ether, the ethyl ether, the propyl ether and the tert.butyl ether, benzil, benzildimethylketal, acetophenone, substituted acetophenones such as diethoxyacetophenone, benzophenone, substituted benzophenones, Michler's ketone and chlorothioxanthone. It is preferred that use should be made of benzildimethylketal. Optionally, coloured compounds such as aromatic azo compounds may be employed.

According to the invention the coating composition still contains one or more polyisocyanates, by which are to be understood here compounds having at least 2 and not more than 10, and preferably 2 or 3 isocyanate groups per molecule. The polyisocyanate may be of aliphatic, cycloaliphatic or aromatic nature and generally contains 6 to 100 carbon atoms and preferably 20 to 50 carbon atoms. As examples of suitable (ar)aliphatic or cycloaliphatic diisocyanates may be mentioned tetramethylene diisocyanate, hexamethylene diisocyanate, $\omega,\omega'$-dipropylether disocyanate, thiodipropyl diisocyanate, cyclohexyl-1,4-diisocyanate, isophoron diisocyanate, dicyclohexyl methane-4,4'-diisocyanate, dicyclohexyldimethyl methane-4,4'-diisocyanate, xylylene diisocyanate, 1,5-dimethyl(2,4-$\omega$-diisocyanatomethyl)-benzene, 1,5-dimethyl-(2,4-$\omega$-diisocyanatoethyl)benzene, 1,3,5-trimethyl-(2,4-$\omega$-diisocyanatomethyl)benzene and 1,3,5-triethyl-(2,4-$\omega$-diisocyanatomethyl)benzene.

As examples of suitable aromatic diisocyanates may be mentioned toluene diisocyanate, diphenylmethane-4,4'-diisocyanate, naphthalene diisocyanate, 3,3'-bistoluene diisocyanate and 5,5'-dimethyldiphenylmethane-4,4'-diisocyanate. As examples of suitable triisocyanates may be mentioned the adduct of 3 molecules of hexamethylene diisocyanate and 1 molecule of water (marketed by Bayer under the trade name Desmodur N), the adduct of 1 molecule of trimethylol propane and 3 molecules of toluene diisocyanate (marketed by Bayer under the trade name Desmodur L) and the adducts of 1 molecule of trimethylol propane or 1 molecule of water and 3 molecules of isophoron diisocyanate.

As an example of a suitable tetraisocyanate may be mentioned the adduct of 1 molecule of pentaerythritol and 4 molecules of hexamethylene diisocyanate. Use also may be made of mixtures of two or more of the above-envisaged polyisocyanates. More particularly, use may be made of the adducts based on hexamethylene diisocyanate, toluene diisocyanate or isophoron diisocyanate.

According to the invention the polyisocyanate is present in the radiation curable composition in such an amount that per equivalent of hydroxyl not more than 1.3 equivalents of isocyanate are available in the composition. As a rule, per equivalent of hydroxyl at least 0.7 equivalents of isocyanate should be available. It is preferred that per equivalent of hydroxyl 0.9 to 1.1 equivalents of isocyanate should be available.

The coating composition may, if desired, still contain other additives, for instance: pigment dispersing agents, levelling agents, fillers, colourant, solvents, polymerization inhibitors such as quinone or a hydroquinone or alkyl ether thereof, p.tert.-butyl catechol, phenothiazine and copper, accelerators for the UV-curing step, for instance tertiary amines such as triethanolamine and N-methyldiethanolamine and catalysts for accelerating the reaction between the polyester and the polyisocyanate after the composition has been applied to the desired substrate.

Application of the coating composition to the substrate may be carried out in any convenient manner, for instance by calendering, rolling, spraying, brushing, sprinkling, flow coating, dipping, electrostatic spraying or by some printing process such as offset printing. It is preferred that the composition should be applied by rolling, spraying, flow coating or offset printing.

The coating composition may with advantage be applied to a substrate of a synthetic material such as polyvinyl chloride, polystyrene, polyester and to metal substrates, for instance as automobile paint or automobile repair paint, and as coil coating or can coating. The composition may further be applied as lacquer to, for instance, timber and plywood, wood-like materials such as chipboard, hardboard, softboard and veneered core board; and to cardboard and paper.

According to the invention hardening of the radiation curable coating composition is effected in 2 stages. In the first stage the composition, after it has been applied to a particular substrate is subjected to radiation having a wave length of 200 to 600 nm, and preferably of 300 to 400 nm. As UV-radiation source there may serve, for instance, a mercury or xenon lamp, which works at high, medium or low pressure. Lamps that are commonly used are those of the Hannovia and HOK types, having a radiant energy of 80 W/cm and HTQ lamps with a radiant energy of 29 W/cm. If desired, also lamps of a lower or higher energy may be employed, such as lamps having an energy of, for instance, 20 W/cm or of 200 W/cm or 250 W/cm. The composition need be exposed to ultraviolet radiation only for a fraction of a second up to a few seconds in order to ensure such drying that the coating layer is tack-free and already displays some degree of hardness. In the second curing stage the coating layer is given its final hardness as a result of the progressing reaction between the isocyanate groups of the polyisocyanate(s) and the hydroxyl groups of the polyester resin and the vinyl compound(s), provided that it (they) contain(s) a hydroxyl group. The second curing step may take place at a temperature in the range of, say, 130° to 200° C. over a period of 5 to 10 minutes. It is also possible, however, for this curing to take place over a period of several days at ambient temperature. It is found that after the coating has been cured for seven days at ambient temperature, the coating layer generally has about the same hardness as after a curing treatment of 10 minutes at 160° C. Carrying out the second curing step at room temperature offers the considerable advantage that it does not require any energy nor any capital expenditure.

The invention will be further described in the following examples which are not to be considered to limit the scope of the present invention. In them the hardness is determined in accordance with Köning (DIN 53157) and is expressed in seconds. The flexibility is determined in accordance with Erichsen (DIN 53156) and is expressed in mm.

PREPARATION OF (METH)ACRYLATED POLYESTERS

EXAMPLES A–G

In a reactor provided with a stirrer, a distillation column, a water outlet, a thermometer and a gas inlet tube there were first of all prepared the non-modified polyesters by polycondensation of the compounds in the amounts mentioned in Table 1. The polycondensation mixture moreover contained toluene in an amount of 5% by weight, based on the polycondensation mixture. The polycondensation was carried out over a period of 5-10 hours. at a temperature of 200°-230° C., the water evolved in the reaction being removed azeotropically until an acid number of 20 was reached. The hydroxyl numbers and the number average molecular weights of the unmodified polyesters obtained are listed in Table 1. After the polyester had been cooled to 80° C., it was diluted with toluene to an 80% by weight solution.

In a second stage the polyesters obtained were esterified with 1.1-5.9 moles of acrylic acid per mole of polyester at a temperature of 100°-130° C. in the presence of 4 mmoles of p-toluene sulphonic acid per mole of acrylic acid and hydroquinone in an amount of 0.2% by weight, based on the total reaction mixture. Upon termination of the esterification 0.18 grams of lithium carbonate per mole of originally present acrylic acid were added and the toluene and the excess acrylic acid were removed by distillation in vacuo. The hydroxyl numbers and the number average molecular weights of the modified polyesters obtained are given in table 1. The acrylic content (in moles) of the polyesters is also given in Table 1.

Table 1

| Constituents (moles) | | A | B | C | D | E | F | G |
|---|---|---|---|---|---|---|---|---|
| Neopentylglycol | | | | 0.18 | | | 0.08 | |
| Pentaerythritol | | 0.25 | 0.25 | 0.32 | | | | |
| Propylene glycol | | | | 0.08 | | | | |
| Diethylene glycol | | | 0.33 | | | 0.27 | | 0.08 |
| Polyethylene glycol (200) | | 0.23 | | | | | | |
| Glycerol | | | | | | 0.45 | | |
| Trimethylol propane | | | | | 0.55 | | 0.48 | 0.48 |
| Phthalic anhydride | | 0.40 | 0.46 | 0.49 | 0.46 | 0.37 | 0.46 | 0.23 |
| Adipic acid | | | | | | 0.13 | | 0.23 |
| Benzoic acid | | | | | | | | 0.08 |
| Lauric acid | | 0.19 | | 0.03 | | | 0.04 | |
| Palmitic acid | | | | | | 0.08 | 0.04 | |
| Acrylic acid | | 0.07 | 0.17 | 0.21 | 0.54 | 0.38 | 0.42 | 0.48 |
| Hydroxyl | non-modified | 175 | 335 | 328 | 267 | 387 | 247 | 268 |
| number | modified | 149 | 245 | 224 | 59 | 196 | 78 | 61 |
| Mn | non-modified | 1273 | 844 | 1322 | 898 | 538 | 931 | 869 |
| polyester | modified | 1302 | 903 | 1431 | 1068 | 621 | 1071 | 1033 |

EXAMPLES I–XIV

The coating compositions according to the invention were prepared by admixing the compounds in Table 2 in the amounts mentioned, in addition to 4 parts by weight of benzildimethylketal as photoinitiator.

Table 2

| Example | Polyester type | Polyester amount | Amount of vinyl compound | Amount of polyisocyanate solution | Exposure time (sec) |
|---|---|---|---|---|---|
| I | A | 70 | 30 | 47 | 4 |
| II | B | 70 | 30 | 48 | 4 |
| III | C | 60 | 40 | 52 | 8 |
| IV | D | 50 | 50 | 22 | 4 |
| V | E | 50 | 50 | 17 | 4 |
| VI | F | 50 | 50 | 27 | 4 |
| VII | G | 50 | 50 | 22 | 4 |
| VIII | D | 60 | 40 | 112 | 12 |
| IX | D | 60 | 40 | 21 | 12 |
| X | D | 50 | 50 | 22 | 4 |
| XI | D | 50 | 50 | 29 | 4 |
| XII | D | 50 | 50 | 10 | 2 |
| XIII | D | 50 | 50 | 22 | 4 |
| XIV | D | 50 | 50 | 23 | 4 |

The vinyl monomer used in the examples I–VII and X–XIV was polyethylene glycol diacrylate, the glycol having a number average molecular weight of 200; in Example VIII hydroxyethyl acrylate was used and in Example IX a mixture of diallyl succinate (25%), diallyl glutarate (50%) and diallyl adipate (25%). The polyisocyanate used in the Examples I–X was the adduct of 3 molecules of hexamethylene diisocyanate and 1 molecule of water. In the Examples XI–XIV there were respectively used the adduct of 1 molecule of trimethylol propane and 3 molecules of toluene diisocyanate; isophoron diisocyanate; the adduct of 3 molecules of isophoron diisocyanate and 1 molecule of water, and finally the adduct of 3 molecules of isophoron diisocyanate and 1 molecule of trimethylol propane. The polyisocyanates in the Examples I–X were used as a 75% by weight solution in a mixture of equal parts by weight of ethylglycol acetate and xylene, the one in Example XI as a 75% by weight solution in ethyl acetate, and the one in Example XIII as a 70% by weight solution in a mixture of equal parts by weight of ethylglycol acetate and toluene, whereas in the Examples XII and XIV the polyisocyanate was used as such.

The resulting coating compositions were applied to tinplate and glass, respectively, to a layer thickness (measured in the wet state) of 10 μm in Example I and of 60 μm in the other examples. The coating layers were then exposed to radiation with a UV lamp of the HOK 5 type (manufactured by Philips) over the periods given in Table 2 (in seconds).

After radiation with the ultraviolet light the coated substrates were left at a temperature of 20° C. over the periods mentioned in Table 3, after which the hardness values were measured. The flexibility was determined after the samples had been kept at 20° C. for 7 days after radiation.

Furthermore, some other part of the coating layers were baked for 10 minutes at a temperature of 160° C. to find out whether the resulting hardness deviated considerably from the hardness obtained after about 3 weeks at 20° C. This was found not to be the case.

Table 3

| Ex. | 2 hours | 1 day | 4 days | 1 week | 2 weeks | 3 weeks | Hardness after 10 min at 160° C. | Flexibility |
|---|---|---|---|---|---|---|---|---|
| I | 26 | 120 | 174 | 174 | — | — | 170 | >7 |
| II | 16 | 58 | 135 | 150 | 165 | 175 | 184 | 7 |
| III | 20 | 41 | 128 | 151 | — | — | 150 | 7 |
| IV | 81 | 130 | 149 | 160 | 178 | 196 | 192 | 5 |
| V | 84 | 105 | 150 | 180 | 185 | 185 | 187 | 6 |
| VI | 52 | 100 | 111 | 123 | 141 | 150 | 152 | 6 |
| VII | 77 | 127 | 146 | 143 | 162 | 172 | 186 | 6 |
| VIII | 66 | 135 | 199 | 194 | 210 | — | 207 | 6 |
| IX | 105 | 180 | 163 | 144 | 159 | — | 198 | 5 |
| X | 81 | 130 | 149 | 160 | 178 | 196 | 192 | 5 |
| XI | 70 | 140 | 169 | 180 | 200 | 210 | 200 | 5 |
| XII | 100 | 120 | 160 | 190 | 198 | 205 | 199 | 5 |
| XIII | 80 | 120 | 140 | 163 | 180 | 192 | 190 | 5 |
| XIV | 85 | 110 | 130 | 170 | 194 | 197 | 191 | 6 |

COMPARATIVE EXAMPLES XV and XVI

For comparison Example II was repeated, with the exception however that either the photoinitiator was left out and the coated object was not exposed to radiation (Example XV) or the polyisocyanate was left out and the coated object was radiated for 1.5 seconds (Example XVI).

Of the resulting coating layers the values of various properties were measured and mentioned in Table 4.

Table 4

| Example | Hardness after 2 hours | Hardness after 4 days | Hardness after 7 days | Hardness after 10 min at 160° C. | Flexibility |
|---|---|---|---|---|---|
| XV | — | 12 | 12 | 15 | — |
| XVI | 32 | — | 38 | — | 6 |

What is claimed is:

1. A method for treating a substrate with a radiation curable coating composition based on a polyester resin esterified with acrylic acid and/or methacrylic acid, a vinyl compound and a photoinitiator, the coating composition being dried under the influence of light having a wave length of 200 to 600 nm, characterized in that the polyester resin esterified with meth(acrylic) acid has a hydroxyl number in the range of 50 to 250 and an ethylenic unsaturation equivalent weight in the range of 200 to 10,000 grams, and in that the coating composition also contains a polyisocyanate in an amount of 0.7 to 1.3 equivalents of isocyanate per equivalent of hydroxyl contained in the composition.

2. The method of claim 1, characterized in that the polyester resin has an ethylenic unsaturation equivalent weight of 250 to 3500 grams.

3. The method of claim 1, characterized in that the unsaturation of the polyester resin is for 35 to 100% caused by the presence of acrylic acid and/or methacrylic acid groups.

4. The method of claim 1, characterized in that the polyisocyanate is present in an amount of 0.9 to 1.1 equivalents per equivalent of hydroxyl.

5. The method of claim 1, characterized in that the polyisocyanate has 2 or 3 isocyanate groups per molecule.

6. The method of claim 1, characterized in that the polyisocyanate used is an adduct based on hexamethylene diisocyanate, toluene diisocyanate or isophoron diisocyanate.

7. A method for treating a substrate with a radiation-curable coating composition comprising
    applying to said substrate a coating composition comprising (1) a polyester resin esterified with acrylic acid and/or methacrylic acid and having an hydroxyl number in the range of 50 to 250 and an ethylenic unsaturation equivalent weight in the range of 200 to 10,000 grams, (2) a polyisocyanate present in an amount of about 0.7 to about 1.3 equivalents of isocyanate per equivalent of hydroxyl contained in said composition, (3) a vinyl compound, and (4) a photoinitiator,
    initially curing the applied coating composition under the influence of light having a wave length of 200 to 600 nm, and
    completing the curing by reacting the isocyanate groups of said polyisocyanate with the hydroxyl groups of said polyester resin.